March 12, 1963 R. D. BLACK 3,080,663

EDUCATIONAL DEVICE

Filed July 10, 1959 3 Sheets-Sheet 1

INVENTOR.
ROY D. BLACK.
BY
Warren D. Flackbert.
ATTORNEY

March 12, 1963 R. D. BLACK 3,080,663

EDUCATIONAL DEVICE

Filed July 10, 1959 3 Sheets-Sheet 2

INVENTOR.
ROY D. BLACK.
BY
Warren H. Flackbert.
ATTORNEY.

March 12, 1963 R. D. BLACK 3,080,663

EDUCATIONAL DEVICE

Filed July 10, 1959 3 Sheets-Sheet 3

INVENTOR.
ROY D. BLACK.
BY
Warren D Flackbert
ATTORNEY

United States Patent Office 3,080,663

Patented Mar. 12, 1963

3,080,663

EDUCATIONAL DEVICE

Roy D. Black, Wabash, Ind., assignor to Leonard R. Crow, Vincennes, Ind.

Filed July 10, 1959, Ser. No. 826,327
8 Claims. (Cl. 35—19)

The present invention relates to an educational device, and more particularly to a new and improved structure which serves as an invaluable teaching aid in the area of rotating electrical machinery.

Heretofore, it has been difficult to provide proper educational instruction on the subject of commercial motors, generators and other types of rotating electrical machines inasmuch as the functional components thereof, such as the brushes, the rotor and the stator, and as well as other parts associated therewith, are usually confined within an enclosed housing, with few or none of the above components being visible therein. Moreover, prior teaching methods have required the use of more than one instructional rotating electrical device in order to adequately cover the fundamentals of the important area of electrical machinery. As can be understood, the need for several devices increased instructional expense, and, in view of the inherent undesirable features of the individual prior instructional devices indicated hereabove, without positive advantages to the student.

In addition, and most importantly, the rotating electrical devices available heretofore for instructional purposes did not provide the opportunity for the instructor to illustrate the effect of varying mechanical and/or electrical relationships between any of the components thereof.

Accordingly, by virtue of the instant invention, the applicant has provided a novel educational device particularly adapted to serve as a teaching aid in the field of electric motors, generators, or other rotating electrical machines, whether the particular instruction is carried on by lecture or through normal classroom training. The applicant's novel teaching aid is particularly advantageous in view of the fact that a relatively small number of components are used to conveniently assemble various electrical rotating machines, and where educational instruction thereon is practical and effective.

With the applicant's new and novel training aid, a common base and machine frame are provided for use in the assembly of a large number of rotating electric machines, including, for example all types of generators, motors, alternators, rotary transformers, synchros, rotary converters and the like, with the applicant providing a simple and effective means for mounting and replacing an armature or rotor in the machine frame, thereby permitting ready instruction on any of the aforementioned rotating electric machines, as desired.

In addition, the applicant's new and novel structure includes means for simply and conveniently positioning a stator or other field structure in the machine frame, and for adjusting the latter to any desired rotational displacement. Moreover, the applicant's novel device permits the ready alignment of bearings, if desired, for adjusting the concentricity of the air gap between the rotor and stator or between an armature and corresponding field pole faces, yet without disturbing the proper functioning of the brush holder mechanism and the relation of the latter to the commutator or slip rings.

The applicant has also provided a novel brush holder mechanism for use with his novel teaching aid whereby the brushes may be shifted longitudinally in relation to each other as well as in relation to a set of collector rings or to a commutator, thus minimizing the number of components required for teaching added electrical phenomena.

Accordingly, a principal object of the present invention is to provide a novel teaching aid structure in the area of electrical rotating machines.

Another object of the present invention is to provide a new and improved educational training device for rotating machinery which has a minimum number of components, but yet which is susceptible to the formation of various combinations thereof for ready instruction in various areas.

A still further object of the present invention is to provide a new and improved structure for instruction on the subject of rotating machines whereby various components may be removed and replaced at will, or where equivalent components may be substituted to broaden the area of use thereof.

A still further and more general object of the invention is to provide an electrical training aid which is readily modifiable, both electrically and mechanically, to achieve the possibility of instruction of a wide number of electrical phenomena.

Other objects and a better understanding of the invention will become more apparent from the following detailed description, taken in conjunction with the accompanying drawings, wherein FIG. 1 is a view in front elevation showing one embodiment of the applicant's novel educational training device, with one mounting support thereof being indicated in disassembled position;

Figures 9, 10, 11, 12, 13, 14, 15, 16, 17, 18, 19:
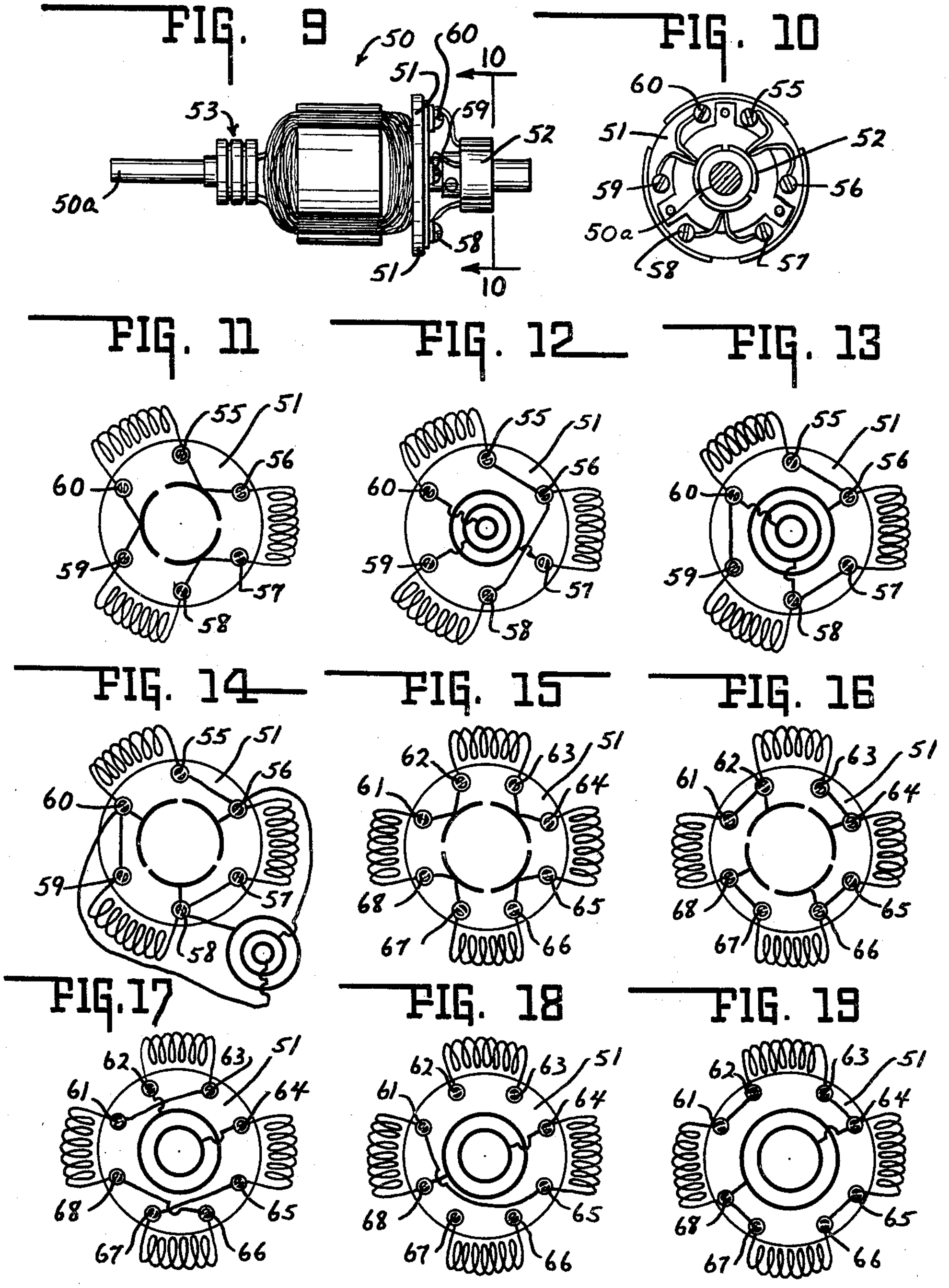
FIG. 9 is a plan view of a three pole rotor in accordance with the teachings of the instant invention.
FIG. 10 is a view of the novel terminal panel of the rotor of FIG. 9, taken at line 10—10 of FIG. 9 and looking in the direction of the arrows.
Figure 20:
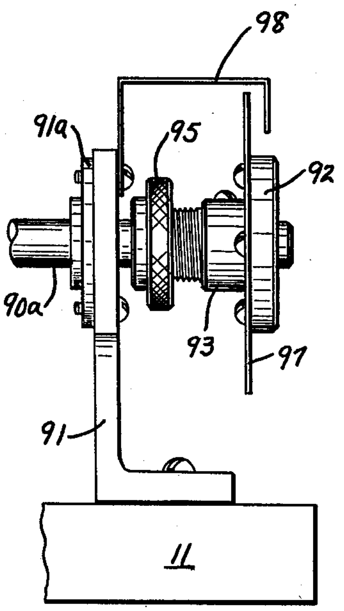
Figure 21:
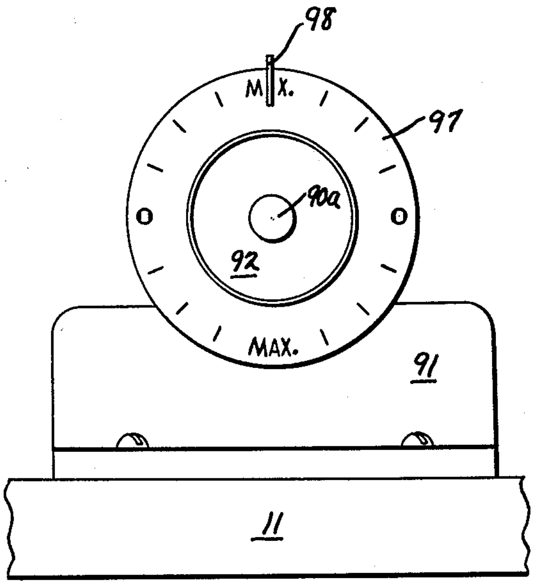

FIGS. 11 to 14, inclusive, are schematic representations of some of the various combinations of coil connections which can be achieved with the terminal panel of FIG. 10;

FIGS. 15 to 19, inclusive, are schematic representations of some of the various coil connections which can be achieved with a terminal panel for a four pole rotor in accordance with the instant invention;

FIG. 20 is a partly fragmentary view in side elevation of a typical mounting and indicator arrangement used where the applicant's novel educational training device serves as a variable transformer; and FIG. 21 is a view in end elevation of the structure of FIG. 20.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
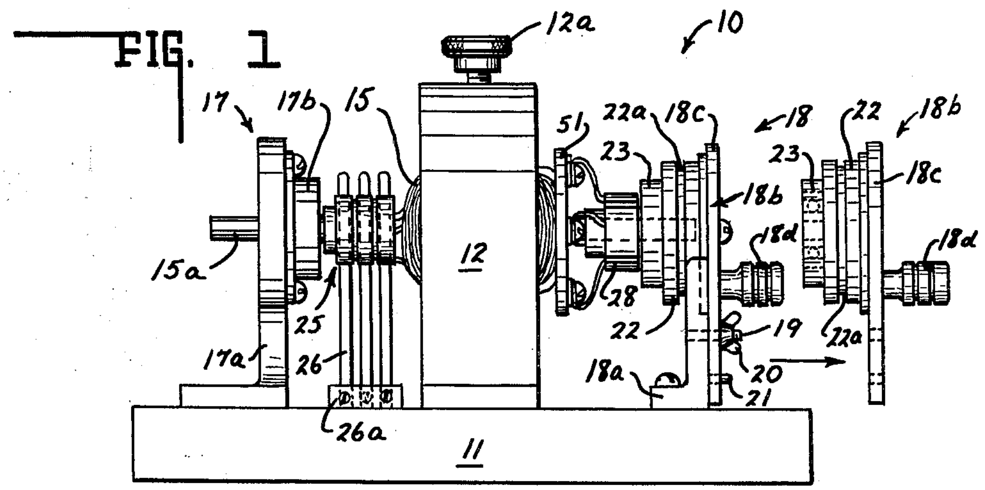
Figure 2:
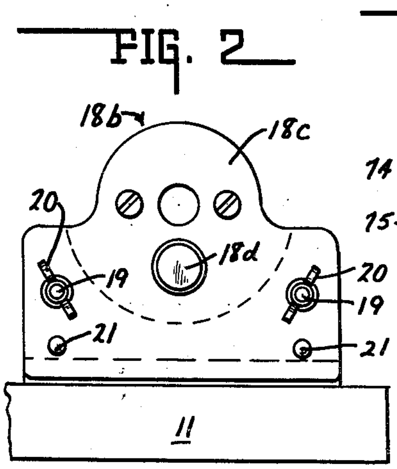
FIG. 2 is a view in end elevation of the mounting support of FIG. 1.

Referring now to FIGS. 1 and 2, the applicant's new and novel electrical educational device 10 includes a base 11, preferably made from wood, having a machine frame 12 suitably secured thereto, as by screws (not shown), for example. Disposed within the machine frame 12 is a conventional stator core with its associated winding (not shown), which stator core is removably positioned therein by a holding screw 12*a*. When assembled, a rotor 15 having an axle 15*a* is conventionally disposed within and rotatable with reference to the stator, with the axle 15*a* of the rotor 15 being mounted for easy positioning and removal through a novel bracket arrangement to be discussed in detail herebelow.

The rotor mounting brackets include a fixed bracket 17 having a base portion 17*a* secured to the base 11 of the educational device 10, with a bearing holder 17*b* being fastened thereon and adapted to receive an end of the axle 15*a* of the rotor 15 through a common ring bearing (not shown) disposed therein. Another mounting bracket 18 is found on the opposite side of the machine frame 12, which mounting bracket 18 includes a base portion 18*a* also secured to the base 11 of the apparatus. In the preferred embodiment of the invention, at least two threaded members 19 extend horizontally from the base portion 18*a* of the mounting bracket 18, with each of such members being adapted to receive a wing-nut 20 upon assembly. Self-aligning taper pins 21 also extend horizontally from the base portion 18*a* of the mounting bracket 18, for reasons which should be apparent from the following discussion.

The structure of the mounting bracket 18 is completed by a removable upper portion 18*b* which includes a frame member 18*c* having openings therein adapted to receive the threaded member 19 and the self-aligning taper pins 21 from the base portion 18*a* thereof. The upper part of the frame member 18*c* of the mounting bracket 18 has a brush holder retainer ring 22 secured thereto, which brush holder retainer ring 22 positions a bearing holder 23 having a conventional ring bearing (shown by broken lines in FIG. 1) adapted to receive an end of the axle 15*a* of the rotor 15 when assembled. The brush holder retainer ring 22 has a groove 22*a* disposed in the peripheral surface thereof which is adapted to receive a brush holder 30 (see FIGS. 4 and 6) of the general type disclosed by my pending patent application Serial No. 766,423, filed October 10, 1958, now Patent No. 2,949,680, for Educational Devices. The mounting bracket 18 is completed by the provision of a handle or knob 18*d* extending from the frame member 18*c* which permits ease in the removal of the upper portion 18*b* thereof.

The typical educational device of FIGS. 1 and 2 includes the use of a conventional split ring type collector 25 positioned on the axle 15*a* of the rotor 15, which split ring collector 25 is engaged by leaf type electrical contact brushes 26 extending upwardly from a support housing 26*a* therefor positioned on the base 11 of the apparatus. Also disposed on the axle 15a of the rotor 15 is a segment type commutator 28 which is adapted to be contacted by brushes 35 extending from the brush holder 30, the specific structure of the latter to be more fully discussed herebelow.

Figures 3, 4:
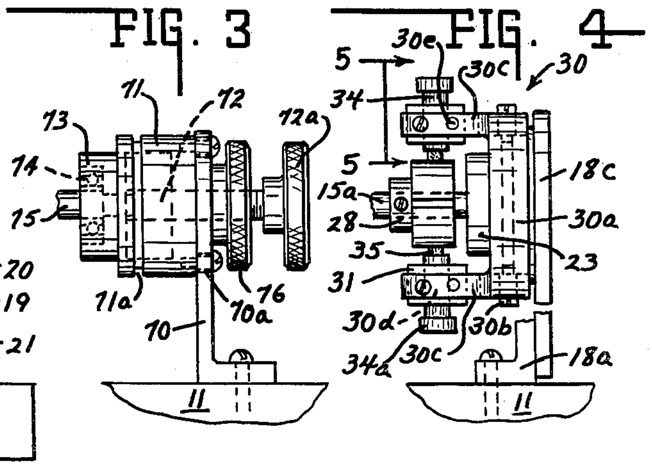
FIG. 3 is a view in front elevation, partly fragmentary, showing an alternate form of mounting support.
FIG. 4 is a view in side elevation showing a brush holder in accordance with the instant invention.
Figures 5, 6, 7:
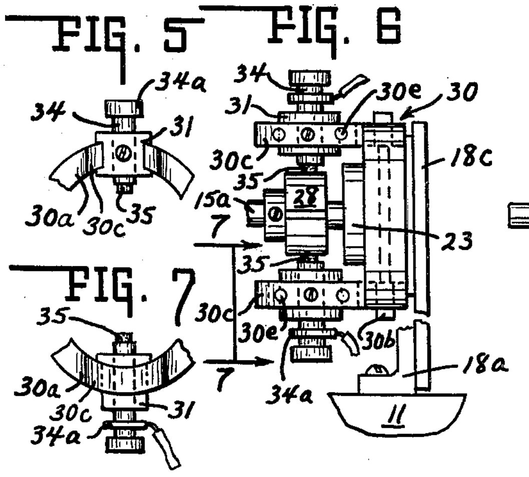
FIG. 5 is a view in vertical section, taken at line 5—5 of FIG. 4 and looking in the direction of the arrows, showing details of an arm of the brush holder.
FIG. 6 is a view in side elevation of an alternate form of brush holder in accordance with the instant invention.
FIG. 7 is a view in vertical section, taken at line 7—7 of FIG. 6 and looking in the direction of the arrows, showing details of an arm of the alternate brush holder structure.

Referring now to the brush holder structure shown in FIGS. 4 and 5, the brush holder 30 includes a circular base member 30*a* adapted to fit over the brush holder retainer ring 22, with screws 30*b* being provided to cooperate with the peripheral groove 22*a* thereof and thereby releasably position the brush holder thereon for use. The brush holder 30 has arms 30*c* extending therefrom, which arms 30*c* each have a slot or cutout portion 30*d* therealong for receiving an insulative brush block 31 which extends therethrough. Each electrical brush 35 is retained in a brush holder tube 34 which extends through the insulative brush block 31, with a conventional spring (not shown) being seated within the brush holder tube 34 and urging the brush 35 against the commutator 28 during use. A conductive collar 34*a* on the brush holder tube 34 provides direct contact with the overall electrical circuit for the apparatus.

The slot or cutout portion 30*d* in each arm 30*c* is so dimensioned to permit movement of the insulative brush block 31 towards and away from the circular base member 30*a* of the brush holder 30 and, hence, axially position each brush 35 with reference to the commutator 28. A plurality of openings 30*e* is provided along the sides of each arm 30*c* for receiving fastening means which extend therethrough to selectively position the insulative brush block 31 for desired use. Inasmuch as the free end of each of the arms 30*c* is open, but yet curves inwardly, movement of the insulative brush block 31 from the arm 30*c* is prohibited, providing a compact unit when in use or while in storage.

The brush holder of FIGS. 6 and 7 represents an alternate structure, where like parts bear similar reference numerals to those in FIGS. 4 and 5. In this instance, each arm 30*c* of the brush holder 30 is closed at the free end thereof, but a slot or cutout portion 30*d* is still provided in each to permit movement of the insulative brush block 31 with reference to the circular base member 30*a* thereof. Again, as in connection with the embodiment of the invention of FIGS. 4 and 5, fastening means are provided to secure each insulative brush block 31 at any position in the slot 30*d* along the arm 30*c*, as desired. It should be apparent that the structures of either FIGS. 4 and 5 or FIGS. 6 and 7 present a brush holder device where the individual brushes 35 are 180° apart, but where the brush holder is selectively movable as a unit around the brush holder retainer ring 22, as desired.

Figure 8:
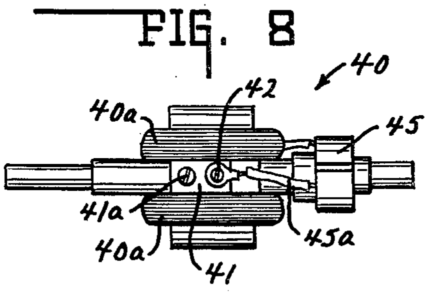
FIG. 8 is a plan view of a typical two pole rotor made in accordance with the teachings of the instant invention, particularly showing the terminal block thereof.

FIGS. 8 and 9 disclose representative rotors made in accordance with the instant invention. FIG. 8 particularly illustrates a two pole rotor 40 which includes a novel arrangement for securing the coil windings 40*a* thereof to stationary terminal panels 41 disposed on opposite sides of the rotor (only one of which is seen in FIG. 8). The stationary terminal panels 41, made from an insulative material, are secured to the shaft 15 of the rotor 40 by conventional screw means 41*a*, while each terminal panel also includes a contact 42 connected to the end of each coil 40*a* of the rotor 40. Jumper lead 45*a* may be provided from these latter contacts 42 to a commutator 45 or to a slip ring collector (not shown), as desired, so that the electrical function of the rotor 40 can be simply and effectively changed without directly disturbing the ends of the coils 40*a* during such replacement.

For example, when the instructor desires to change the electrical operation of the educational device from a direct current generator to an alternator, the commutator 45 is simply removed and a set of slip rings mounted on the rotor axle in its place, with the slip rings being positioned thereon by means of a common set screw.

Jumper leads on the slip rings are then fastened to the respective contacts 42 on the stationary terminal panels 41, such connection being expedited by the use of conventional spade terminals on the free ends of the jumper leads. It should be apparent, therefore, that the preceding novel arrangement prevents the breaking of the ends of the coils 40*a* because the coils themselves are not touched, irrespective of the number of times the commutators and the slip rings are interchanged.

With reference to FIGS. 9 and 10 where a typical three pole rotor 50 is disclosed, the applicant provides a novel insulative disc 51 which is equivalent in purpose to the insulative panels 41 of FIG. 8. As in the instance of the two pole rotor, the rotor shaft 50*a* is adapted to interchangeably receive a segment type commutator 52 or a slip ring type collector 53, as desired. The insulative disc 51 is provided as a terminal strip or panel to which the respective leads of the three coils of the rotor are connected at contacts 55, 56, 57, 58, 59 and 60 thereof. With the use of either or both the segment type commutator 52 or the slip ring type collector 53, the instructor or student can, with proper connection between the respective contacts, achieve a wide number of electrical effects.

For example, let us assume that it is desired to use the rotor or armature 50 as a part of a direct current rotating machine. With a typical three segment type commutator (see FIG. 11), the user merely connects contacts 55 and 56, contacts 57 and 58, and contacts 59 and 60 with respective jumper leads from each of the segments of the three segment commutator. It should be apparent, therefore, that with this novel arrangement, an electrical change can be readily accomplished without any direct contact with the ends of the coils and without the necessity of using a number of different rotating machines to illustrate a given phenomena.

FIGS. 11 to 14, inclusive, are indicative of the various connections which can be made on the insulative disc 51 of FIGS. 9 and 10, merely by a change of connections between the respective terminals and/or substitution of a segment type commutator for a slip ring type collector. Actually, FIGS. 11 to 14, inclusive, are diagrammatic representations of various connections, with the particular contacts thereof bearing the same identifying reference numeral as found in the corresponding structure of FIG. 10.

As indicated heretofore, FIG. 11 illustrates the connection of the three coils of the rotor as a direct current armature. FIG. 12 illustrates the connection of these same coils for use as an elementary type of three phase Y connected armature, whereas FIG. 13 illustrates the interconnections on the applicant's novel terminal panel or insulative disc 51 to effect a three phase delta connected armature. FIG. 14 is illustrative of the interconnection of the three coils to a three segment commutator (for directed current) and to three slip rings so that the rotating armature can be used to produce either direct current or a three phase current output.

FIGS. 15 to 19, inclusive, indicate the use of the applicant's novel insulative disc in connection with a four coil armature or rotor, where like electrical contacts are identified with the same reference numeral in each of the figures. Considering now the electrical effects which can be achieved by various interconnections between the electrical contacts, FIG. 15 illustrates a direct current commutated output with a four segment commutator having two terminal leads to each segment, whereas FIG. 16 shows the interconnection between terminal contacts where the commutator is supplied with one connector to each commutator segment.

FIG. 17 illustrates the four coils forming the rotor connected in series to produce a four pole armature of a single phase alternator. FIG. 18 illustrates the use of two coils of the four coil armature connected to a single set of slip ring collectors for production of one phase of a two phase current output. The other two coils of the four coil combination (which are not shown connected) are connected in an identical manner to an additional pair of slip ring collectors on the opposite end of the armature winding. FIG. 19 illustrates the use of the applicant's novel terminal panel or insulative disc to form a two pole single phase armature having two coils per pole.

It should be readily apparent from the above that the applicant's novel terminal panel, modified in accordance with the number of poles forming the armature, affords the user a great variety of electrical connections from the same apparatus for teaching various electrical phenomena. It should be understood that similarly effective results can be achieved with the use of a six coil armature or rotor. Moreover, with further reference to the two pole rotor of FIG. 8, it should be noted that by providing the insulative panel 41 with two electrical contacts, the leads from both of the coils may be connected thereto and, in this manner, serve to illustrate, for example, parallel and/or series connections to a two segment commutator, or series or parallel connected coils to a set of slip ring collectors for an armature or rotary member of a single phase rotating machine.

Referring again to FIGS. 1 and 2, in use, the desired rotor 15 is inserted through the stator mounted on the base 11 of the apparatus 10, with one end of the axle **15*a* of the rotor 15 being supported by mounting bracket 17 through bearing holder 17*b*, and the other end thereof being received in the bearing holder 23 disposed in the brush holder retainer ring 22 on the upper portion 18*b* of the mounting bracket 18. It should be apparent that the aligning pins 21 assist in positioning the movable upper portion 18*b* of the mounting bracket 18 on the base portion 18*a* thereof, so that the wing-nuts 20 can be readily secured to the threaded members 19** for rigid assembly. Prior to mounting, the desired commutator or slip ring type of collector, connected through the insulative panel or disc to the rotor coils in one of the various representative combinations discussed hereabove, is positioned on the axle of the rotor and then, after setting the desired brush holder in position, the applicant's novel apparatus is ready for effective instructional purposes. Moreover, with little effort, any components of the machine may be changed, as desired, to demonstrate other electrical effects.

FIG. 3 illustrates an alternate form of movable mounting arrangement for the applicant's novel educational device 10 where a brush holder ring mount 71, in the form of a sleeve member, is secured to an upstanding bracket 70 conventionally secured to a base 11 of the educational device. The brush holder ring mount 71 includes a groove **71*a* on its peripheral surface for the same purpose discussed above in connection with the mounting arrangement of FIGS. 1 and 2. A shaft 72 axially extends through the brush holder ring mount 71 and has a bearing holder 73 at one end thereof having bearings 74 recessed therein for receiving an end of an axle 75 of a rotor. The opposite end of the shaft has a knob 72*a* affixed thereto, with a locking member 76 threadedly engaging the shaft 72 so that, when positioned, the shaft 72 can be secured against subsequent rotational displacement. It should be noted that the bracket 70 has enlarged openings 70*a* for receiving the screw means which secure the brush holder ring mount 71 thereto, which enlarged openings 70*a*** serve as a means of special alignment for the rotor.

When used, the alternate mounting arrangement of FIG. 3 receives the end of the axle 75 of the rotor and the bearing holder 73 is rotated to and fro within the recess of the brush holder ring mount 71 to accommodate the overall length thereof. The locking means 76, when moved into engagement with the side wall of bracket 70, serves to secure or position the rotor after final adjustment. It should be noted that this particular novel mounting arrangement provides a high degree of stability as the recess within the brush holder ring mount 71 is so dimensioned to provide a wide travel area thereon for the bearing holder 73, hence, providing a distinct advantage thereto.

As should be apparent from the preceding, the applicant's novel educational device is susceptible to numerous uses to illustrate various electrical effects. Among these, for example, the unit may serve to illustrate a variable transformer, with means being provided therefor for varying the transformer output from zero to a maximum amount and for accurately indicating such variable output without special or auxiliary meters. Referring particularly to FIGS. 20 and 21, it should be apparent that by use of a two pole stator and a two pole rotor (not shown), the rotor may be turned within the stator so that the rotor is cut by the magnetic lines of force present from the stator winding (assuming that the stator is the primary winding), so that the rotor output varies from zero to a maximum value for each half rotation of the rotor. The rotor axle 90*a* extends through a bearing retainer 91*a* positioned on a bracket 91 conventionally secured, as by screws, for example, to the base 11 of the apparatus.

Inasmuch as the back torque increases as the rotor is turned from zero output towards that of a maximum value, means are provided for controlling the rotor movement by hand through a knob 92 secured to a hub 93 disposed on one end of the rotor axle 90*a*. Locking means in the form of a knurled jam nut 95 threadedly engages the hub 93 and is movable to a position in engagement with the bracket 91, as desired. In addition, a calibrated scale 97 together with an indicator pointer 98, respectively positioned on the knob 92 and the bracket 91, may be used to identify the various positions of the rotor.

In use, when the scale 97 is once calibrated by placing the zero reading thereon directly beneath the indicator pointer 98 when the rotor is at zero position, the calibrated scale 97 can thereafter be used for reading correct electrical output without the use of auxiliary meters. Moreover, any desired output can be maintained, irrespective of the back torque, by rotating the jam nut 95 to a position in contact with the bracket 91, thereby locking the mechanism in such position.

It should be apparent from the above that the applicant's novel educational device provides a versatile instructional device in the field of rotating electrical machinery which is simple to use, convenient to assemble and disassemble, highly effective in results, and very practical insofar as storage and manufacturing costs are concerned. The device is capable of a wide number of uses, many of which were indicated hereabove, and, accordingly, the preceding description should be considered illustrative and not as limiting the scope of the following claims.

I claim:

1. A brush holder for an electrical educational training device comprising a body portion adapted to be received on a bracket thereon, said body portion of said brush holder having at least one arm extending therefrom, said at least one arm having a continuous slotted portion disposed therein, a brush element carried in a member positioned by an insulative block disposed in said continuous slotted portion of said at least one arm, said insulative block being positionable along said continuous slotted portion in said at least one arm with respect to the body portion of said brush holder, and means for securing said insulative block in pre-selected positions along said continuous slotted portion in said at least one arm.

2. In a rotary member for an educational training device, a shaft, coils disposed on said shaft, an insulative panel positioned on said shaft and having contacts thereon fixedly connected to said coils, current collecting means disposed on said shaft, and detachable means connecting said contacts and said current collecting means.

3. In a rotary member for an educational training device, a shaft, coils disposed on said shaft, an insulative panel positioned on said shaft and having a plurality of contacts thereon fixedly connected to said coils, current collecting means disposed on said shaft, and detachable means connecting said plurality of contacts with each other and with said current collecting means.

4. In an electrical educational training device having a stator and a rotor and serving as a variable transformer, in combination, means mounting said rotor within said stator, means for rotating said rotor with respect to said stator, and means for mechanically locking said rotor against rotation at any desired degree of rotation, said locking means operatively engaging said mounting means.

5. In an electrical educational training device having a stator and a rotor and serving as a variable transformer, in combination, means mounting said rotor within said stator, means for rotating said rotor with respect to said stator, means for mechanically locking said rotor against rotation at any desired degree of rotation, said locking means operatively engaging said mounting means, and means disposed on said training device for indicating said degree of rotation.

6. In an electrical educational training device having a rotary member, a first support for positioning an end of said rotary member, a second support for positioning another end of said rotary member, said second support comprising a sleeve member adapted to receive means for mounting said another end of said rotary member, and means selectively engageable with said second support to mechanically lock said end mounting means at any desired axial position with reference to said sleeve member.

7. The electrical educational training device described in claim 6 where said end mounting means is rotatable within said sleeve member.

8. A support for positioning an end of a rotary member in an electrical educational training device comprising a sleeve member adapted to receive means for mounting said end of said rotary member, and means selectively engageable with said support to mechanically lock said end mounting means at any desired axial position with reference to said sleeve member.

References Cited in the file of this patent

UNITED STATES PATENTS

| | | |
|---|---|---|
| 742,408 | Evans et al. | Oct. 27, 1903 |

FOREIGN PATENTS

| | | |
|---|---|---|
| 181,020 | Great Britain | May 3, 1923 |
| 411,289 | Great Britain | June 7, 1934 |
| 101,630 | Switzerland | Oct. 1, 1923 |